United States Patent [19]

Madden et al.

[11] Patent Number: 6,091,424
[45] Date of Patent: Jul. 18, 2000

[54] LABELING GRAPHICAL FEATURES OF DRAWINGS

[75] Inventors: Brendan P. Madden, Berkeley, Calif.; Konstantinos G. Kakoulis, Dallas; Ioannis G. Tollis, Plano, both of Tex.

[73] Assignee: Tom Sawyer Software, Berkeley, Calif.

[21] Appl. No.: 08/743,427

[22] Filed: Nov. 1, 1996

[51] Int. Cl.[7] .................................................... G06T 7/00
[52] U.S. Cl. ............................................................ 345/433
[58] Field of Search ...................................... 345/433–443

[56] References Cited

U.S. PATENT DOCUMENTS

| | | | |
|---|---|---|---|
| 5,450,535 | 9/1995 | North ........................................ | 345/440 |
| 5,684,940 | 11/1997 | Freeman et al. .......................... | 345/438 |

OTHER PUBLICATIONS

Christensen, et al., "An Empirical Study of Algorithms for Point–Feature Label Placement", *ACM Trans. on Graphics*, vol. 14, No. 3, pp. 1–23 (1995).

Kakoulis, et al., "On the Edge Label Placement Problem", *Proc. 1996 International Symposium on Graph Drawing (GD '96)*, Lecture Notes in Computer Science, vol. 1190, S. North, editor, pp. 241–256 (1997).

van Roessel, "An Algorithm for Locating Candidate Labeling Boxes Within a Polygon", *The American Cartographer*, vol. 16, No. 3, pp. 201–209 (1989).

Wagner, et al., "Map Labeling Heuristics: Provably Good and Practically Useful", Proceedings of the 11th Annual ACM Symposium on Computational Geometry, pp. 109–118 (1995).

Zoraster, "Positioning Large Labels Inside Small Polygons", *Landmark, Canada.TXT*, pp. 1–9 (1994).

Zoraster, "The Solution of Large 0–1 Integer Programming Problems Encountered in Automated Cartography", *Operations Research*, vol. 38, No. 5, pp. 752–759 (1990).

*Primary Examiner*—Almis R. Jankus
*Attorney, Agent, or Firm*—Burns Doane Swecker & Mathis L.L.P.

[57] ABSTRACT

A method is provided for automated placement of labels for a given graph layout or map. Even though in practice a label is usually associated with a line (edge), point (node) or area, this method can be extended to produce labeling solution for any graphical feature with explicit geometric representation (in two or three dimensions). This method first finds a labeling solution for a set of graphical features G by eliminating a subset of the set of potential label placements for any member of G, and reducing the labeling problem to a maximum matching problem of a bipartite graph. Next, if there are graphical features in G that have no label placement assigned to them yet, a backtracking algorithm may be used to improve the space available for the labeled graphical features. It may be shown that the labeling problem is NP-hard if any graphical feature in G is a line or point. As a result, the GFLP problem cannot be solved in polynomial time, but requires the application of well-devised heuristics.

19 Claims, 18 Drawing Sheets

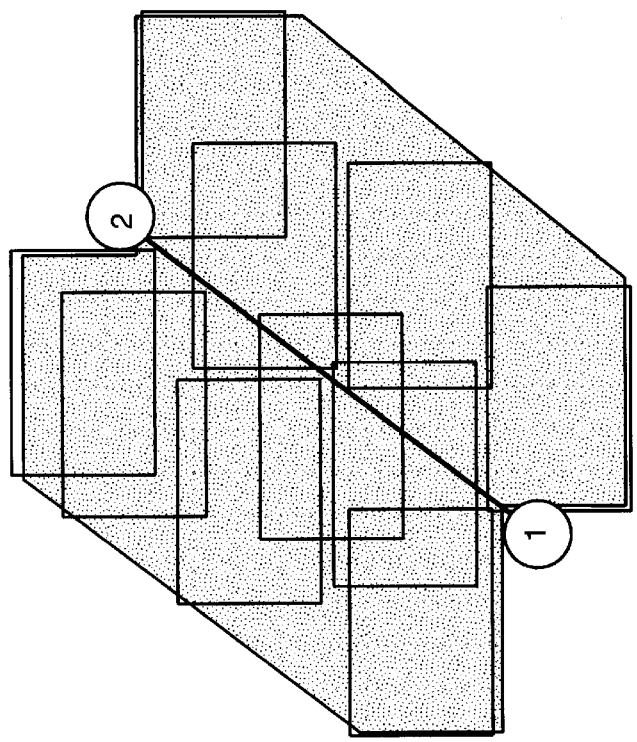
*FIG._1B*
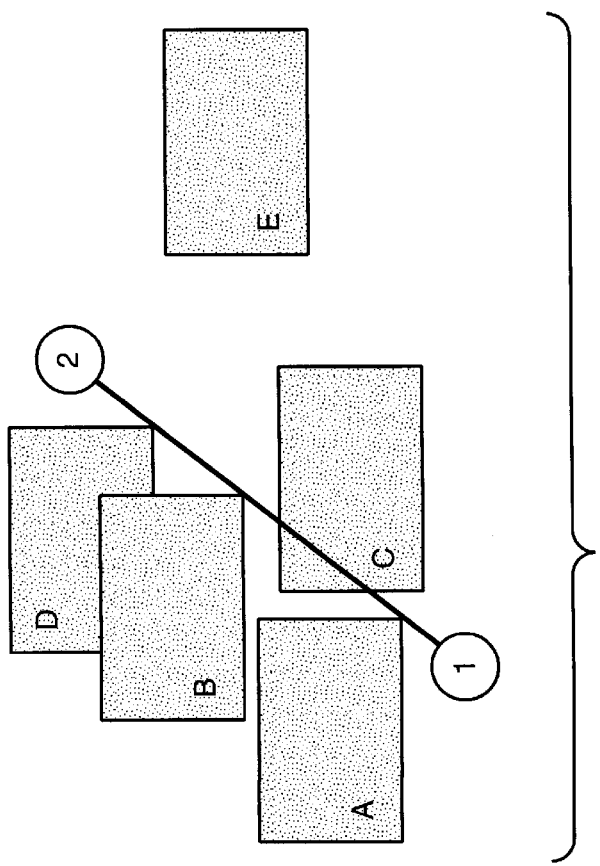
*FIG._1A*

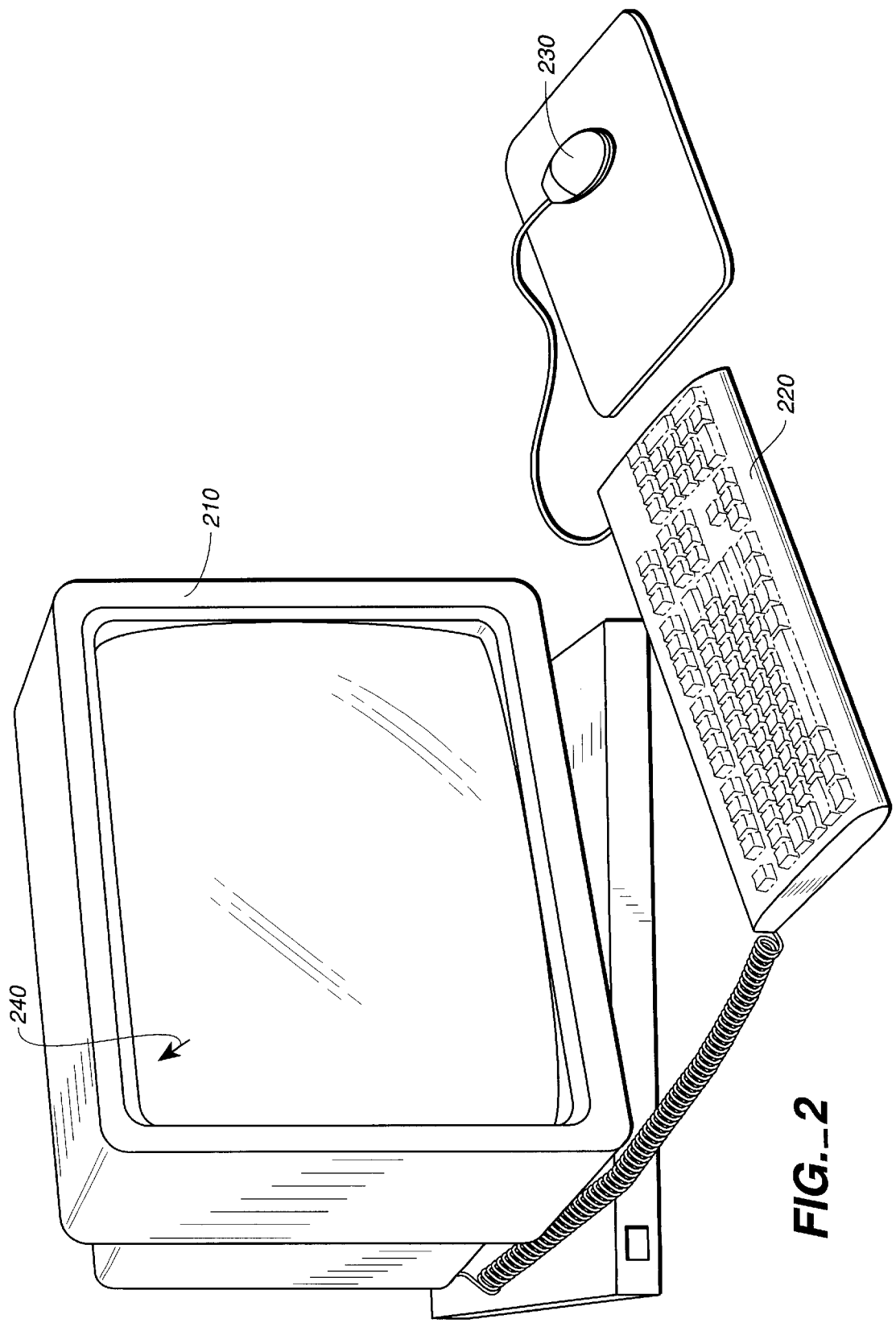
FIG._2

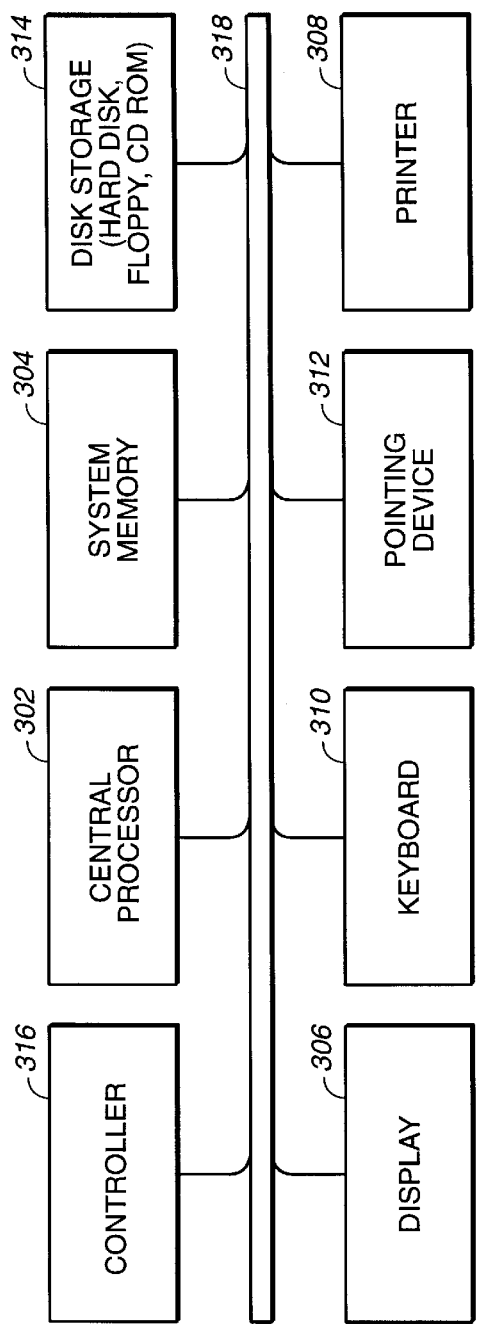
FIG._3
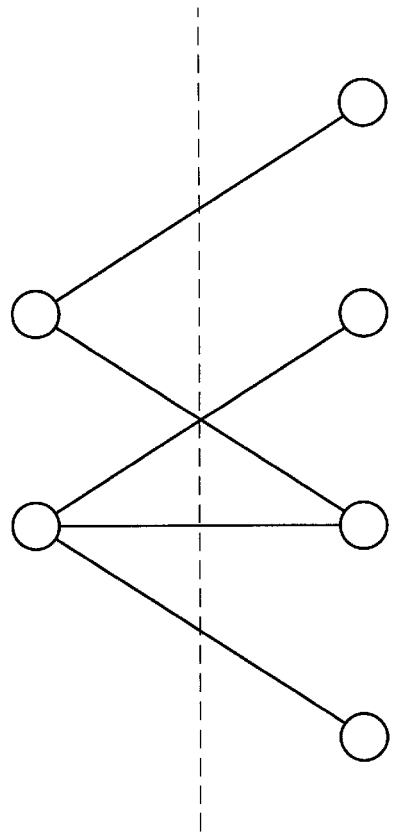
FIG._4

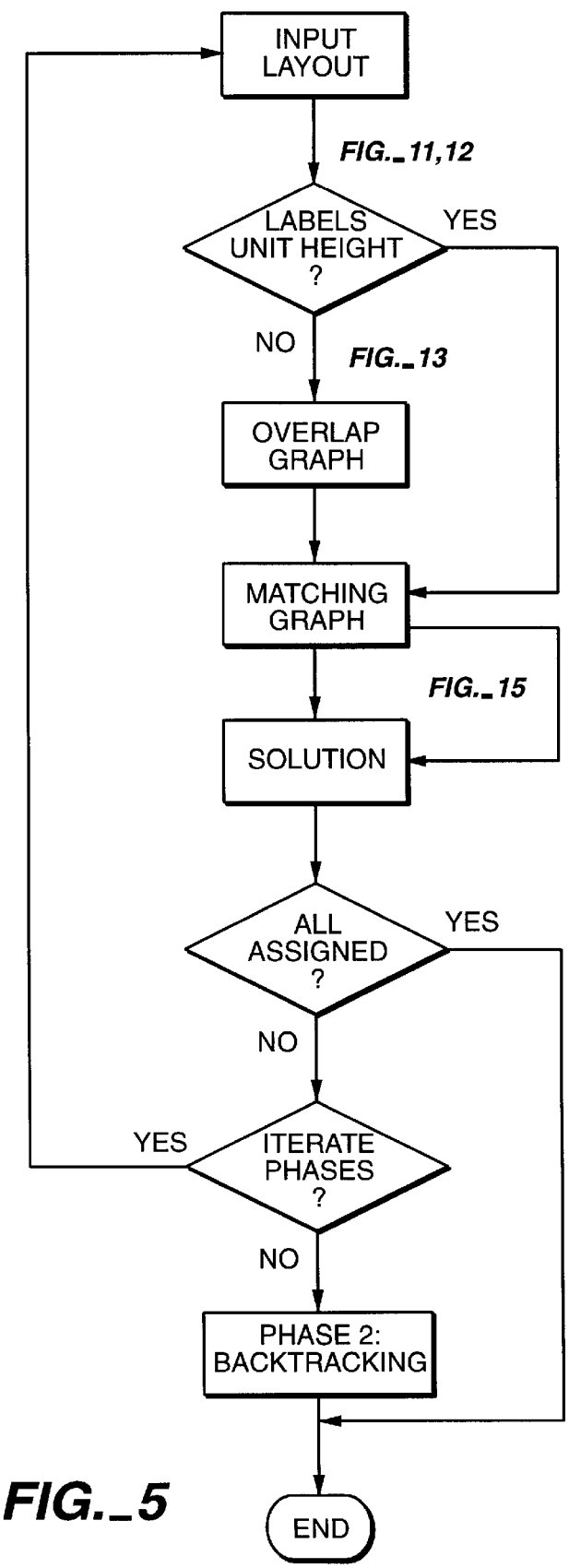
FIG._5

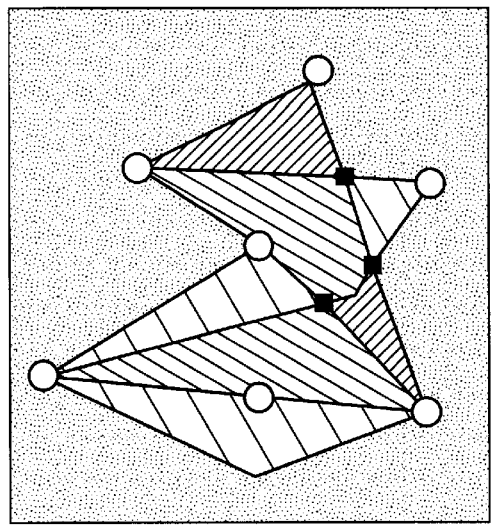
FIG._6C
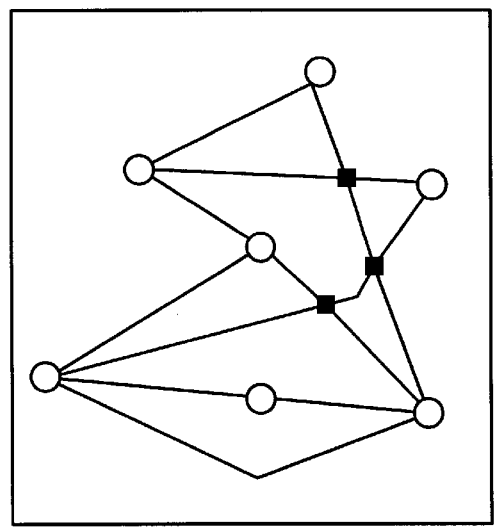
FIG._6B
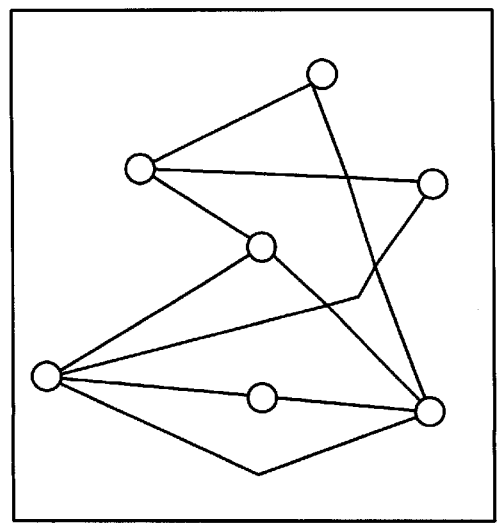
FIG._6A

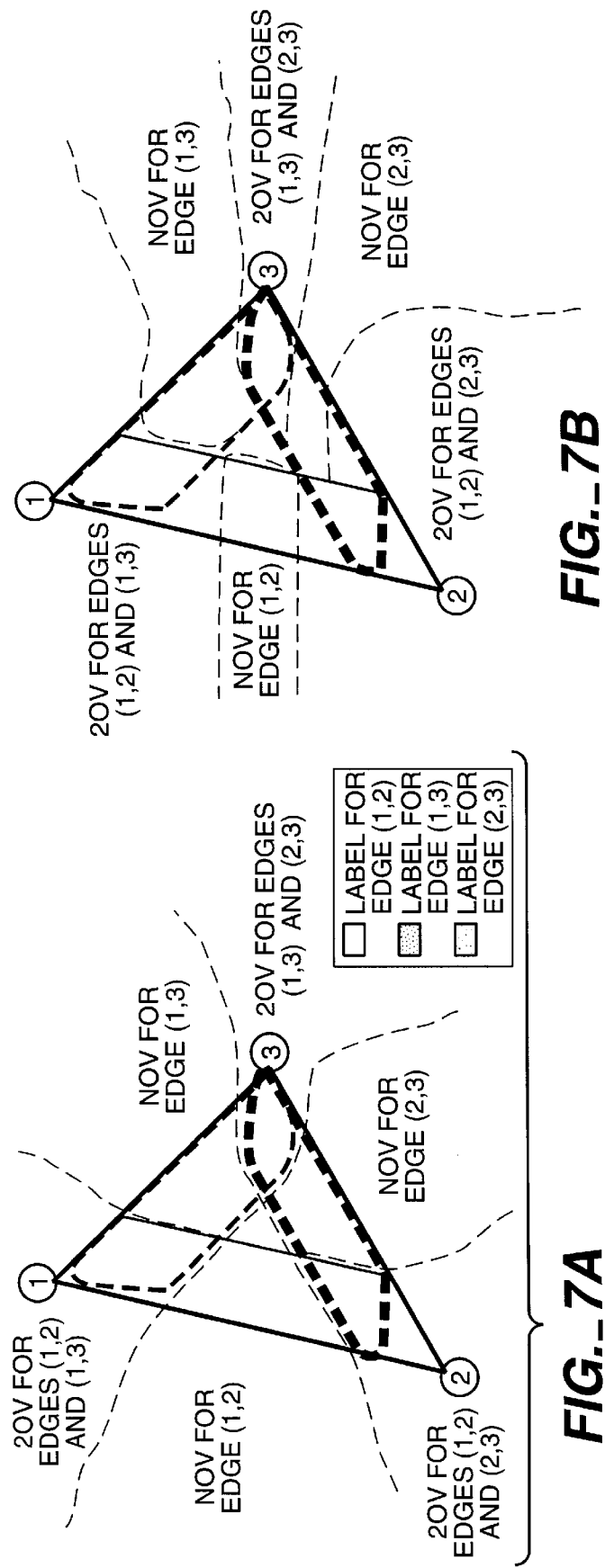

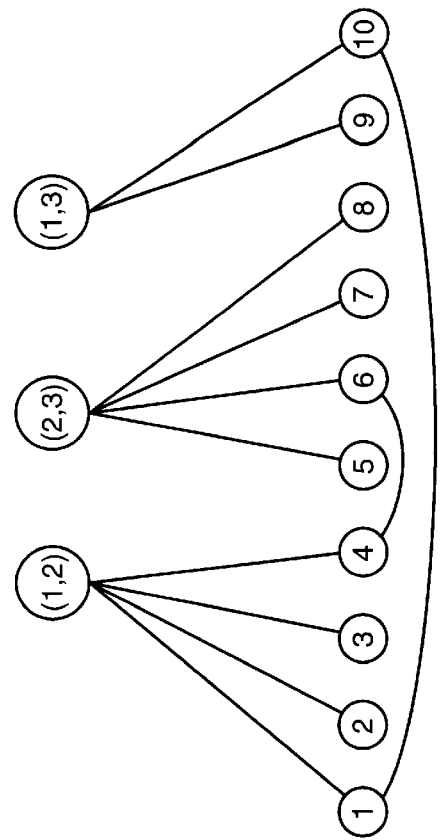
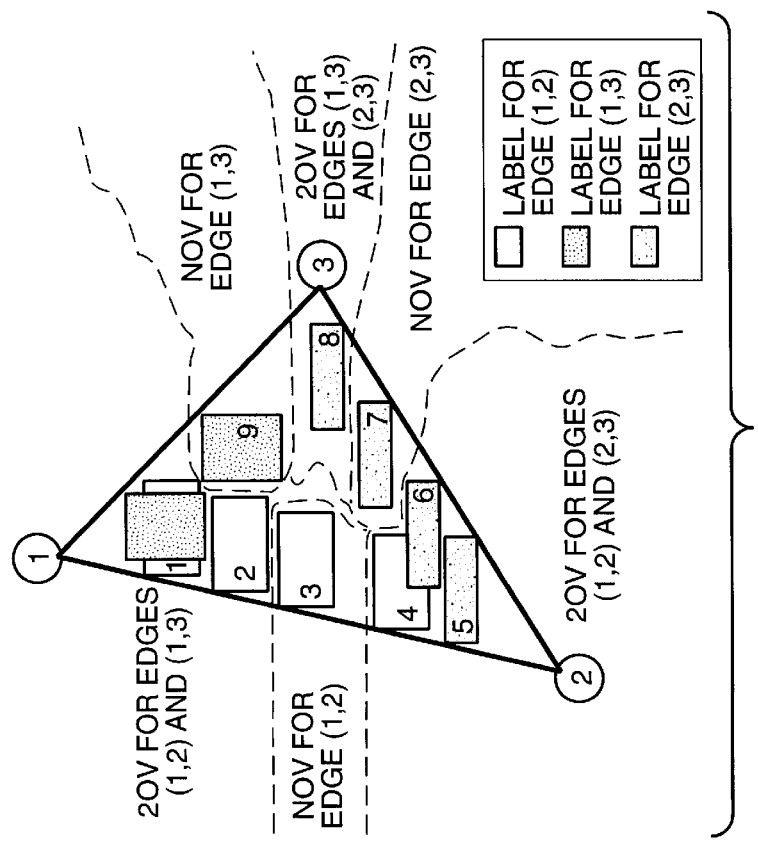
FIG._8A
FIG._8B

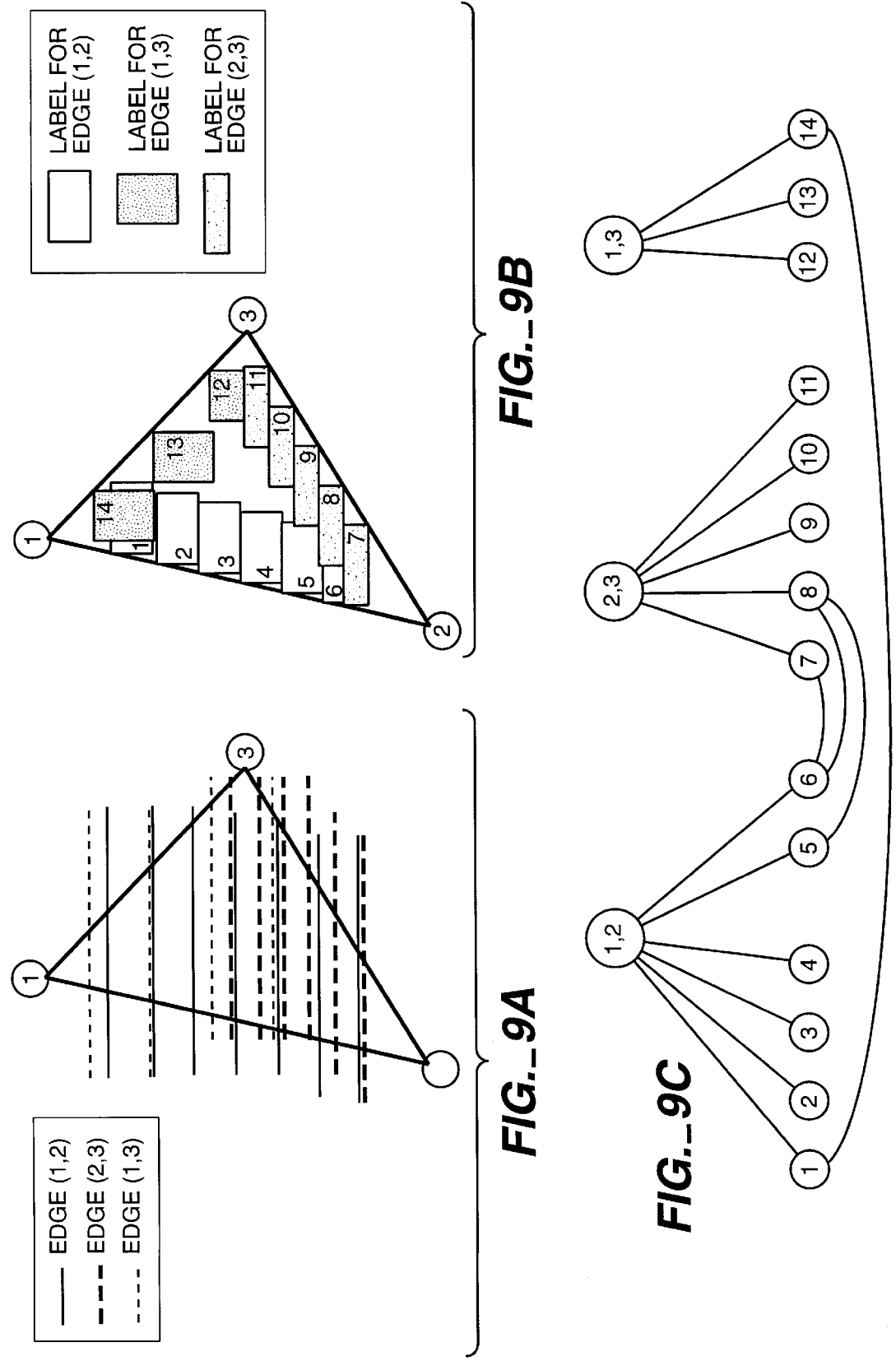
FIG._9A  FIG._9B  FIG._9C

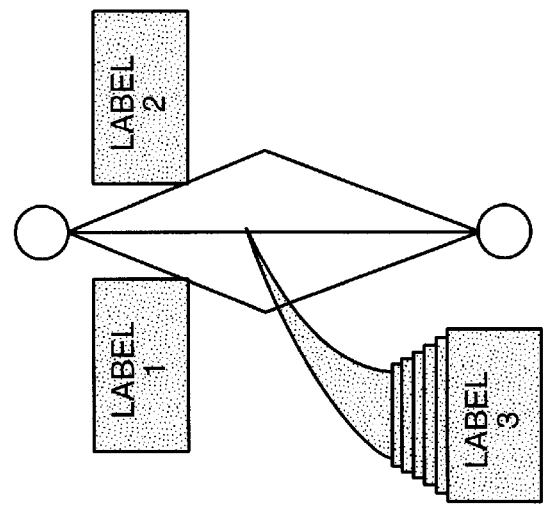
FIG._10C
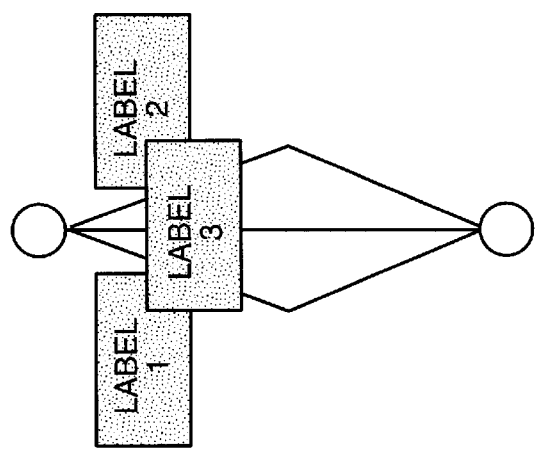
FIG._10B
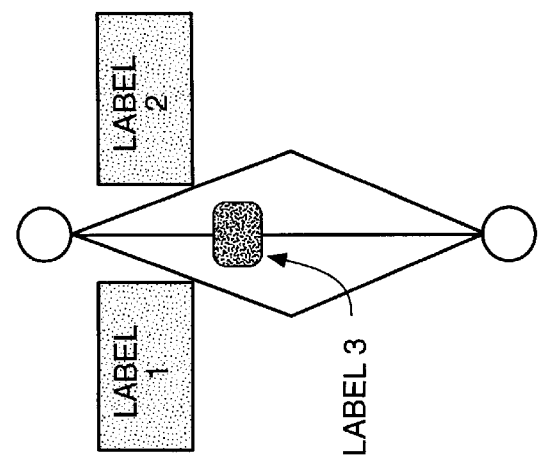
FIG._10A

HEURISTIC A
BEGIN
STEP 1
    For each cluster do:
        For each edge that is part of the border of this cluster do:
            Divide the labeling space of that edge into 3 types of regions:
            a) The portions NOV of the labeling space that is free of overlaps.
            b) The portions 2OV of the labeling space that overlaps the labeling space of exactly one other edge.
            c) The portions MOV of the labeling space that overlaps the labeling space of more than one other edges.
STEP 2
    We build the overlap graph $G_{ov}(V_{ov}, E_{ov})$ as follows:
    For each edge i in the original graph we introduce a node $V_i$ in $G_{ov}$.
        For each cluster cl of the layout do:
            For each edge i and each k such that SubLS(i,k) ∩ cl ≠ ∅ do:
                For each portion NOV s in cl of i do:
                    If s is enough to include a number of discrete labels for i then
                        Introduce a node $v_s$ in $G_{ov}$ and an edge $(v_i, v_s)$ in $E_{ov}$.
                  Else
                      If a 2OV region of i is adjacent to s then
                        Increase that region to include s.
                      Else
                        If a MOV region of i is adjacent to s then
                            Increase that region to include s
                        Else
                            Remove s from RLS(i).
                For each portion 2OV s in cl of i do:
                    If s is enough to include a number of discrete labels for i then
                      For each such label do:
                          Introduce a node $v_s$ in $G_{ov}$ and an edge $(v_i, v_s)$ in $E_{ov}$.
                  Else
                      If a MOV region of i is adjoint to s then
                        Increase that region to include s
                      Else
                          Remove s from RLS(i)
                For each portion MOV s in cl of i do:
                    If s is enough to include a number of discrete labels for i then
                      For each label do:
                          Introduce a node $v_s$ in $G_{ov}$ and an edge $(v_i, v_s)$ in $E_{ov}$.
                  Else
                      Remove s from RLS(i)
STEP 3
    Find all the conflicts between the labels of STEP 2.
        If labels $l_1$ and $l_2$ overlap then
            Add an edge $(v_{l1}, v_{l2})$ between their corresponding to nodes in $G_{ov}$.
END.

FIG._11

HEURISTIC B
BEGIN
STEP 1
    We build the overlap graph $G_{ov}(V_{ov}, E_{ov})$ as follows.

For each edge i in G do:
        Introduce a node $v_{Ei}$ in $G_{ov}$.
    For each edge i in G do:
        For each region SubLS(i,j) do:
            Assign a number of discrete labels to i.
    For each edge i do:
        For each label assigned to i do:
            Introduce a node $v_L$ in $G_{ov}$ and an edge $(v_{Ei}, v_{Li})$ in $E_{ov}$.
STEP 2
    Find all the conflicts between the labels of STEP 1.
        If labels $l_1$ and $l_2$ overlap then .
            Add an edge $(v_{l1}, v_{l2})$ between their corresponding to nodes in $G_{ov}$.
END.

FIG._12

Reduction: Heuristic C
BEGIN
STEP 1
    We build graph $G_R$ as follows:
    $G_R = G_{ov}$
    For each node v in $G_R$ do:
        If node v corresponds to an edge of the original graph
            Remove node v from $G_R$ and its incident edges.
STEP 2
    We build $G_m$ in the following way:
        For each edge i of the original graph do:
            Add a node $v_{Ei}$ in $V_{mE}$.
STEP 3
    For each edge i do:
        If there is only one node $v_i$ in $G_R$ corresponding to a label of edge i then:
            Remove all nodes incident to $v_i$.
STEP 4
    For each node $v_{Li}$ in $V_{label}$ do:
        If $v_{Li}$ has degree 0 then
            Add this node in $V_{mL}$ and add an edge in $E_m$ that connects this node
            to node $u_{Ei}$ in $V_{mE}$.
            Remove $v_{Li}$ from $G_R$.
    For each connected component cc in $G_R$ do:
        If cc is a complete graph then
            Add a node v in $V_{mL}$.
            For each node $v_{Li}$ in cc do:
                Add an edge in $E_m$ that connects node v to node $v_{Ei}$ in $V_{mE}$.
            Remove cc from $G_R$.
STEP 5
    For each connected component cc left in $G_R$ do:
        For each node $v_{Li}$ in cc do:
            If a node $u_{Ei}$ in $V_{mE}$ is connected to at least 2 nodes in $V_{mL}$ of degree 2
            that connect to the same node in $V_{mE}$, then
                Remove node $u_{Ei}$ from cc
                Return to Step 3.
        Remove the node from cc with the highest degree.
        Return to Step 3.

Randomly remove a node from cc.
        Return to Step 3.

FIG._13

Heuristic D
STEP 1
> If the minimum weight incident edge of a node in $V_E$ connects this node to a node in $V_L$ of degree 1 then:
> > Assign this edge as a matched edge.
> > Update $G'$.

STEP 2
> If a node in $V_E$ has degree 1 then
> > Assign its incident edge as a matched edge.
> > Update graph $G'$.
>
> Repeat STEP 2 until no new edge has been matched.

STEP 3
> $G'$ consists of nodes in $V_E$ that have degree 0 or degree at least 2.
> > Delete those nodes from $G'$ with degree 0.
>
> > For each node in $V_E$ we keep only the 2 edges of least weight and remove the rest of the edges from $G'$.
> > Now each node in $V_E$ has degree 2, and each node in $V_L$ has degree at most 2.
> > The remaining bipartite graph has an interesting structure. It is a simple cycle or a simple path. Any such graph has exactly 2 maximum cardinality matchings. Since the number of edges is even, we can find by just traversing the cycle or path and pick as part of the matching only the even or odd numbered edges.
> > Choose the one matching of minimum weight.

END.

Note:
> The Update($G'$) operation removes the 2 nodes incident to a new matched edge and stores that edge and its incident nodes as part of the matching. Also removes all incident edges from the 2 nodes.

*FIG._14*

INPUT:
    A drawing G and a set of graphical features GF.
BEGIN
PHASE 1
START LOOP
    STEP 1
        Compute an overlap graph $G_{ov}$ for G
        (for each iteration use a different set of discrete labels to form the overlaping graph. In the first iteration use the maximum number of labels and for each consecutive iteration remove those labels that produce the most overlaps or labels that belong to graphical features that have a number of labels associated with them already in the overlaping graph.)
    STEP 2
        Reduce the overlap graph $G_{ov}$ to a matching graph $G_{matching}$
    STEP 3
        If specified further reduce the matching graph.
    STEP 4
        Run the matching algorithm on the matching graph.
        If the matching is complete
            Exit the program a labeling assignment found.
        Else
            If the size of the labels assigned in the matching is above a user-set threshold and(or) after a number of iterations
                Exlt loop
END LOOP
PHASE 2
    STEP 1
        Run Backtracking algorithm
    STEP 2
        If there are graphical features with no labels assigned
            Relaxe restrictions on overlaping of labels with any graphical feature of the drawing.
            Run Backtracking algorithm
    STEP 3
        If there are graphical features with no labels assigned
            Force placement of labels or do not assign labels or assign labels as shown in Figure 6.
END.

*FIG._15*

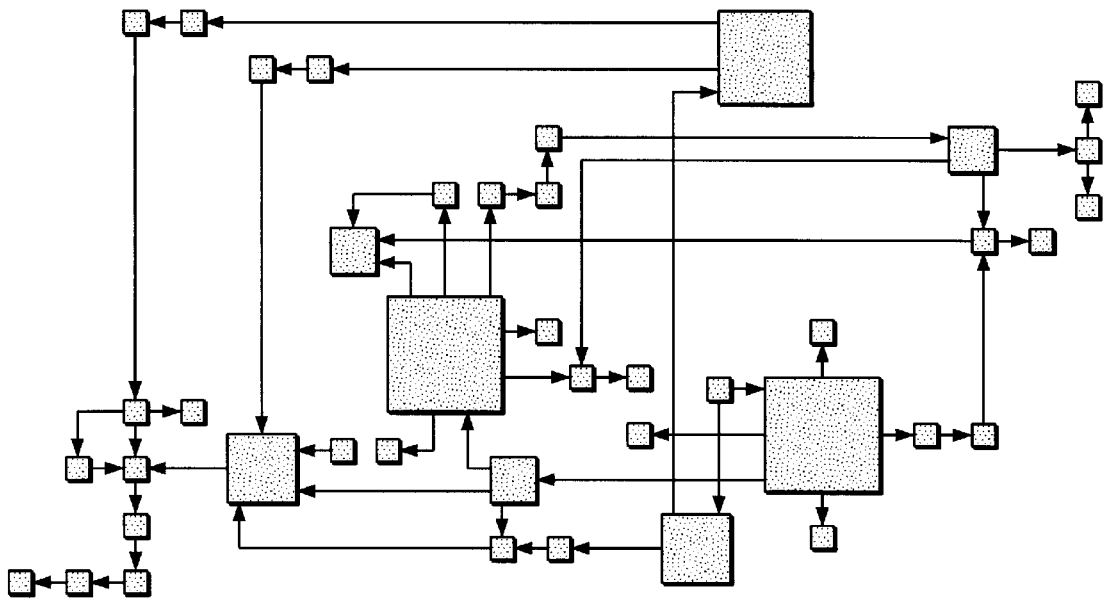
FIG._16
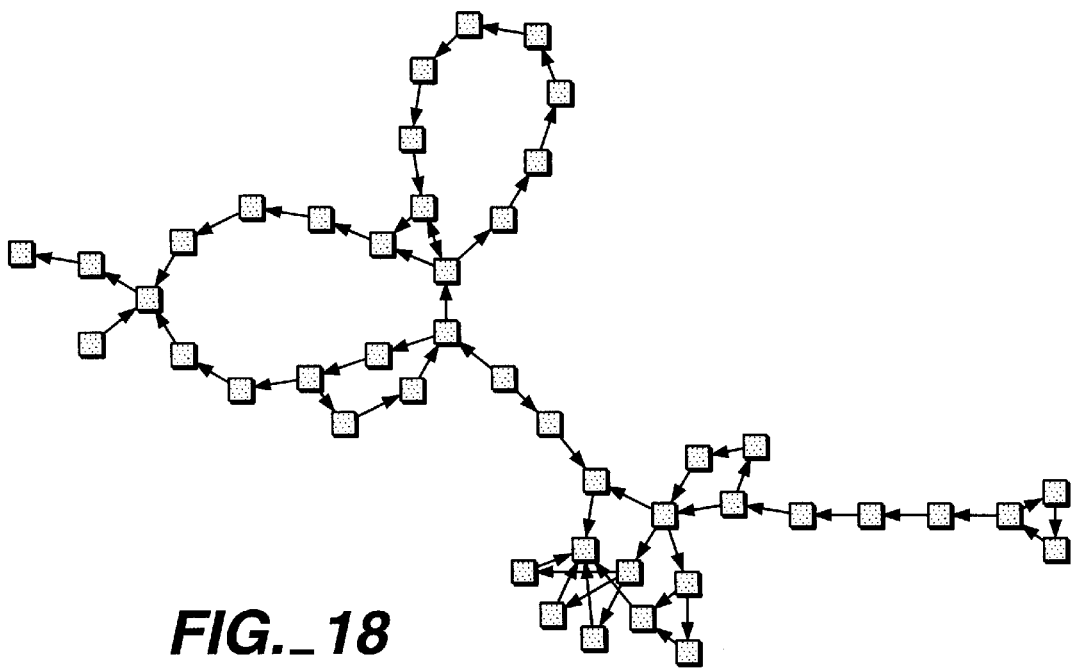
FIG._18

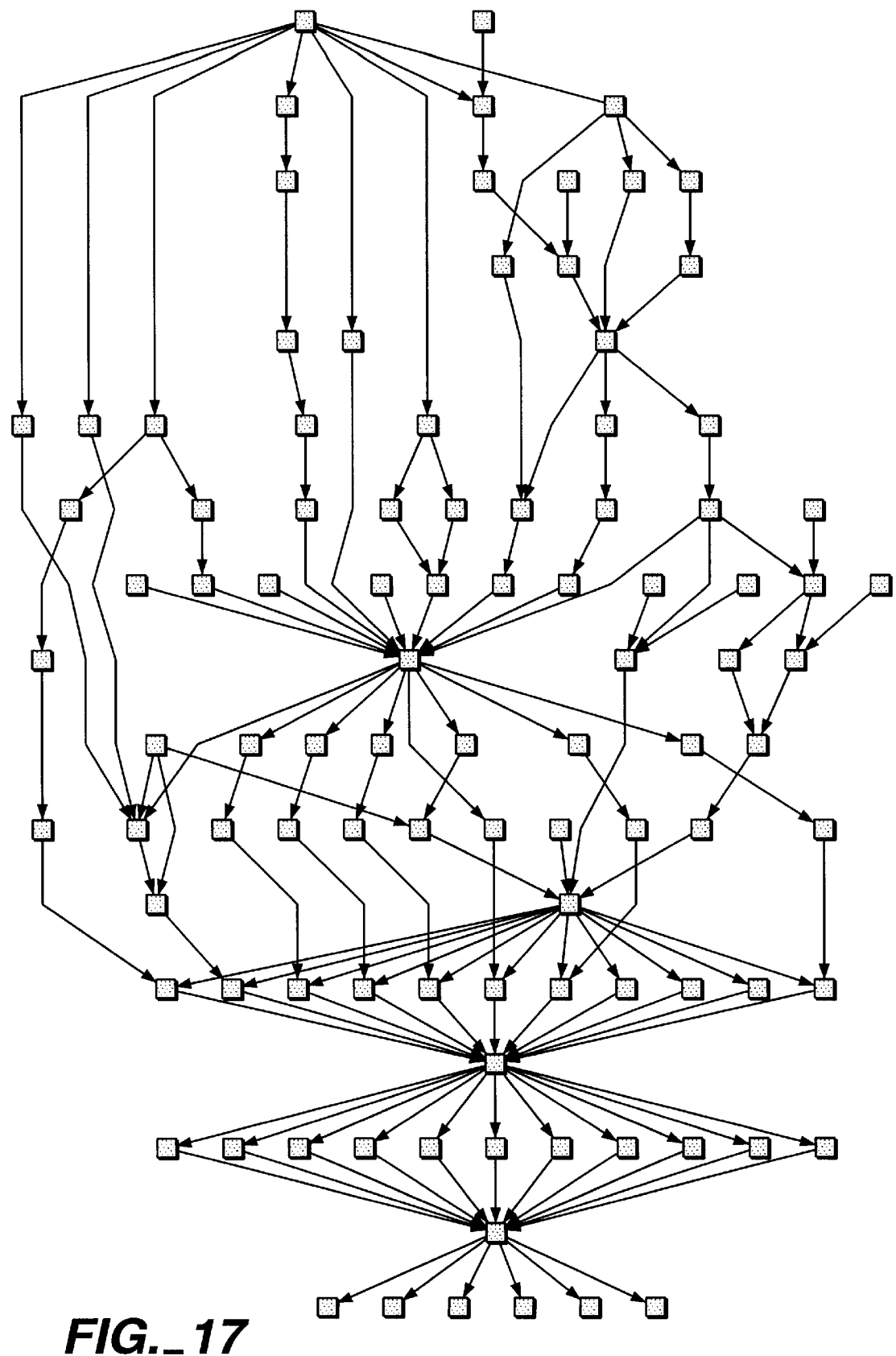
FIG._17

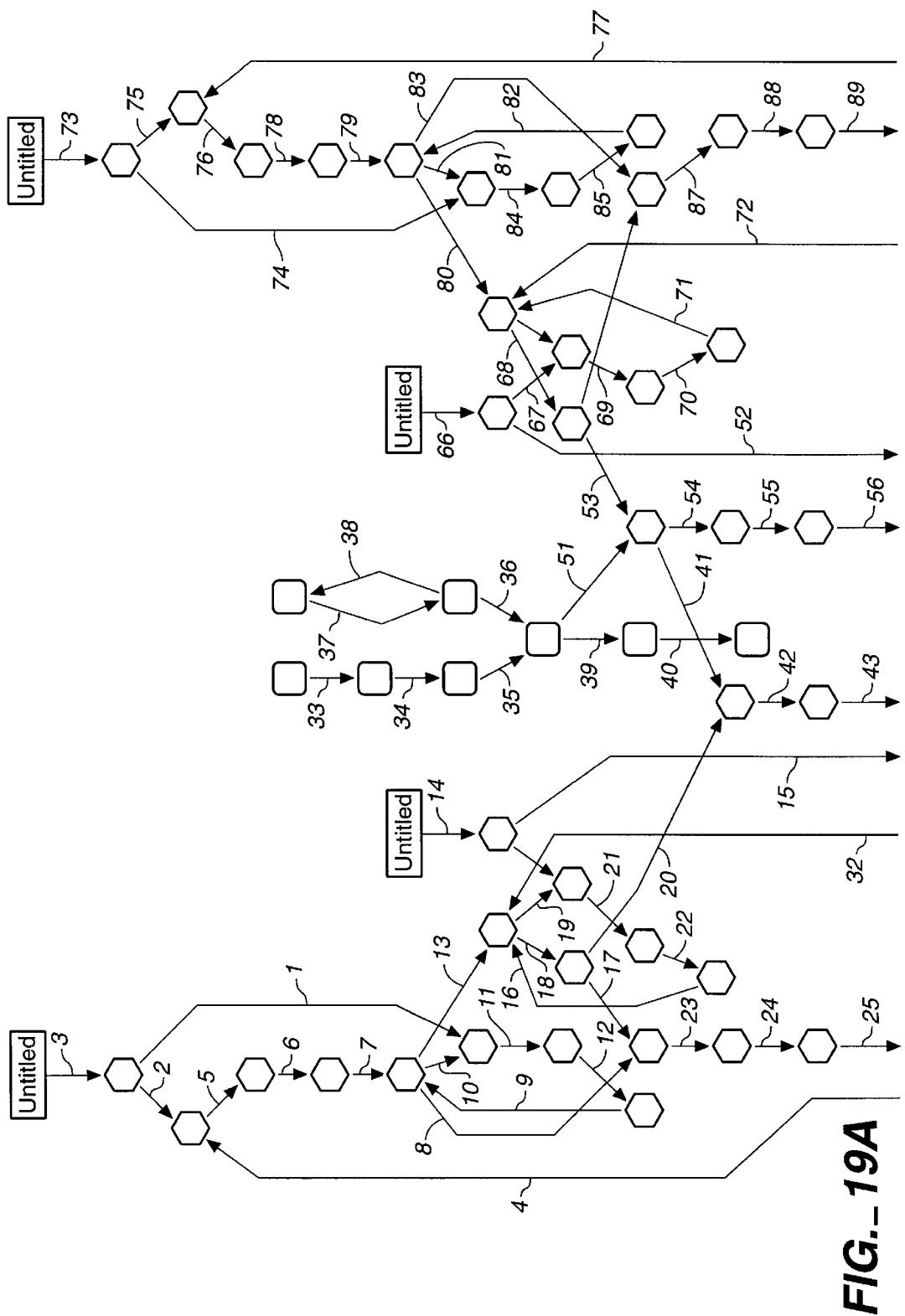
FIG._19A

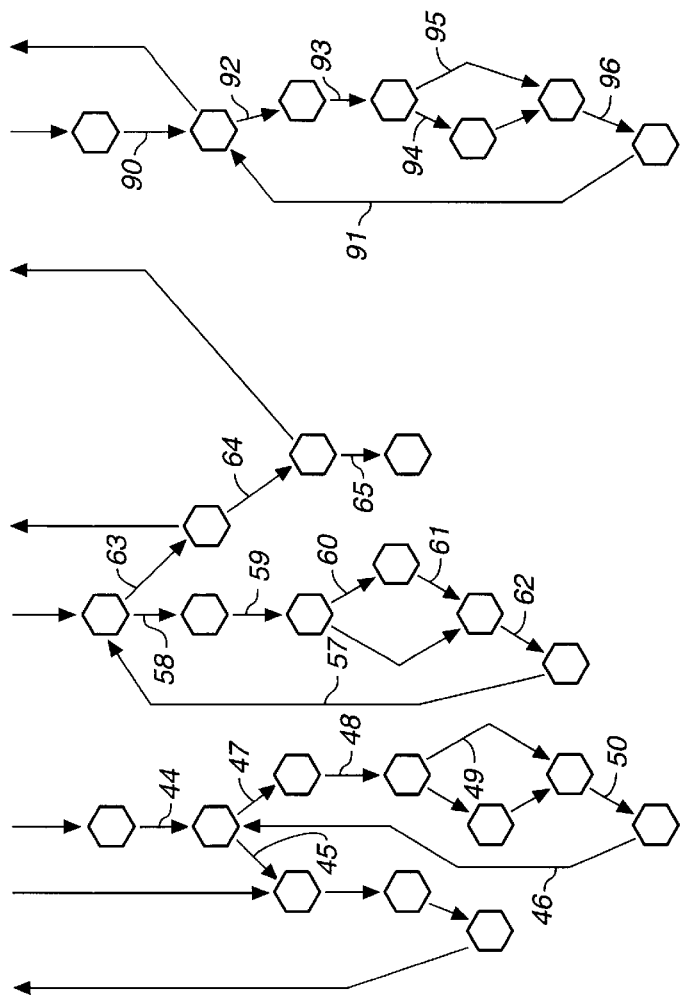
FIG.-19
FIG.-19A
FIG.-19B
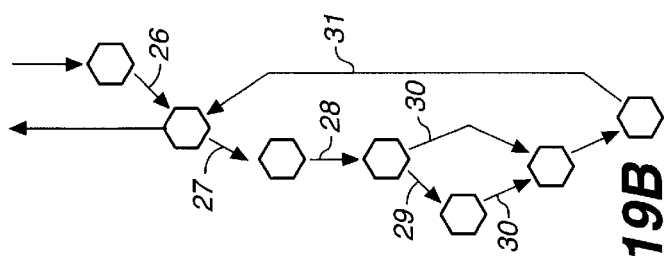
FIG.-19B

LABELING GRAPHICAL FEATURES OF DRAWINGS

BACKGROUND OF THE INVENTION

1. Field of the Invention

This invention relates to systems for the automated placement of labels in relation to graphical features of two- or three-dimensional drawings, either drawings produced by layout tools or drawings that in a scaled version depict "real" drawings (i.e., geographical maps and technical maps). More precisely, this invention relates to automatically producing a labeling solution for a given graph layout or map.

2. State of the Art

Graph drawing is a general area of computer science or mathematics that attempts to develop algorithms which may be used to produce aesthetically pleasing "drawings" of graphs from abstract topological information about the nodes in a graph and the edges that connect them together. A related discipline is that of graph labeling. The need for automated placement of labels in relation to graphical features first emerged from placing labels in relation to features of technical, and particularly geographical, maps. The first attempts to automate the labeling process are almost twenty years old.

In recent years, a growing recognition of a large number of applications of graph drawing have caused it to receive increased attention. Graph drawings find application in many different areas including, among others, such areas as database design (e.g, entity relationship diagrams), software engineering, CASE, software debugging, and communication networking. The labeling of the graphical features of a drawing in most of these applications is essential, since it gives important information about the relations represented by the drawing.

As used in the present specification, the term "label" is used to refer to text or other indicia to be placed on a drawing. The term "label placement" is used to refer to one or more selected areas within which a label may be placed. The term "label assignment" is used to refer to a label placement that has been chosen. Finally, the term "labeling solution" is used to refer to a set of label assignments for multiple labels such that the label placements satisfy specified criteria.

Most of the past research on the labeling problem has been done for labeling geographic and technical maps. Most prior-art techniques devised to solve the Graph Feature Label Placement (GFLP) problem are trivial in nature. Previous approaches have used greedy algorithms, exhaustive-search (backtracking) algorithms, algorithms that simulate physical models (i.e., Simulated Annealing), and reduction of the labeling problem to a variant of 0-1 integer programming. These techniques either do not produce the desired results, due to their tendency to get trapped in local optima, or they take exponential time.

Almost all of the algorithms devised to solve the GFLP problem (or a restricted version of the GFLP problem) have been focused more on the problem of labeling points and less on the problem of labeling lines.

In geographical maps, the labeling of lines (the Edge Label Placement, or ELP problem) is less restrictive than the labeling of points (Node Label Placement, or NLP problem), due to the fact that lines are usually long, and thus offer many possible positions for placing labels. The edge density of any drawing can vary. Hence, edge labeling algorithms, to be of practical importance, must perform well even for drawings with very high edge density. Since the ELP problem is NP-hard, any effective approach to solve the ELP problem must be directed toward devising heuristics for that problem.

SUMMARY OF THE INVENTION

The present invention, generally speaking, provides a method for assigning label placements to features of a graph drawing, using various heuristics. This method can be extended to solve the line labeling problem (or edge labeling problem for graph layouts) in a more sophisticated and more effective way than previous methods. The advantage of this method is that it finds a labeling assignment, at least in the first phase of the algorithm, that takes into account the drawing as a whole. In other words, it tries to find a solution using "global" information about the drawing. This dramatically differs from other approaches to solving the GFLP problem, which either start from random initial label placements or placements that disregard the overlaps between them. In accordance with one aspect of the present method, it provides sufficient conditions that guarantee an optimal labeling solution. In accordance with another aspect of the present method, it provides heuristics that explore the labeling space by trying to construct the aforementioned sufficient conditions in order to obtain a good labeling solution.

BRIEF DESCRIPTION OF THE DRAWING

The present invention may be further understood from the following description in conjunction with the appended drawing. In the drawing:

FIG. 1(a) is a diagram of potential edge label placements in relation to an edge (1, 2) of a graph drawing;

FIG. 1(b) is a diagram of a continuous edge label placement space in relation to the edge (1, 2);

FIG. 2 is a perspective view of a computer system with which the present invention may be used;

FIG. 3 is a block diagram of the computer system of FIG. 2;

FIG. 4 is an example of a matching graph;

FIG. 5 is an overall flowchart of a labeling method according to the present invention;

FIG. 6(a) is a diagram of a graph drawing having edge crossings;

FIG. 6(b) is a diagram of the graph drawing of FIG. 6(a) with edge crossings replaced by virtual nodes;

FIG. 6(c) is a diagram of the graph drawing of FIG. 6(b) with clusters identified by different shadings;

FIG. 7(a) is a diagram of a cluster of a drawing in which labeling spaces for each graphical feature (e.g., edge) have been partitioned into disjoint regions having no overlaps, two overlaps, or more than two overlaps;

FIG. 7(b) is a diagram similar to that of FIG. 7(a) but in which potential label placements have been restricted to be parallel to the horizontal direction;

FIG. 8(a) is a diagram corresponding to FIG. 7(b) in which potential label placements are shown;

FIG. 8(b) is a diagram of a portion of an overlap graph corresponding to the diagram of FIG. 8(a);

FIG. 9(a) is a diagram of a cluster divided into three sets of strip indicated by different styles of lines, each strip accommodating a label placement for a corresponding edge;

FIG. 9(b) is a diagram corresponding to FIG. 9(a) in which potential label placements are shown;

FIG. 9(c) is a diagram of a portion of an overlap graph corresponding to the diagram of FIG. 9(b);

FIG. 10(a) is a diagram of a first style of label that may be used when a label cannot be placed without overlap;

FIG. 10(b) is a diagram of a second style of label that may be used when a label cannot be placed without overlap;

FIG. 10(c) is a diagram of a third style of label that may be used when a label cannot be placed without overlap;

FIG. 11 is a flowchart of a heuristic, referred to as Heuristic A, used to form an overlap graph describing potential label placements;

FIG. 12 is a flowchart of a heuristic, referred to as Heuristic B, used to form an overlap graph describing potential label placements;

FIG. 13 is a flowchart of a heuristic, referred as the Heuristic C, used to reduce an overlap graph to a matching graph;

FIG. 14 is a flowchart of a heuristic, referred to as Heuristic D, used to find a minimum-weight, maximum cardinality matching of the matching graph;

FIG. 15 is a flowchart of an overall algorithm in accordance with the present invention;

FIG. 16 is an example of an orthogonal graph layout;

FIG. 17 is an example of a hierarchical graph layout;

FIG. 18 is an example of a symmetric graph layout; and

FIGS. 19A–19B are an example of a labeled graph drawing produced using the methods described herein.

DETAILED DESCRIPTION OF THE PREFERRED EMBODIMENTS

The present invention, in a preferred embodiment, may be embodied in software as part of a Graph Layout Toolkit of a type sold by the present assignee. The Graph Layout Toolkit is a family of portable, automated, object-positioning libraries designed for integration into Graphical User Interface (GUI) application programs. It makes graphs more readable by choosing logical (x,y) positions for nodes and a suitable routing for edges. The Graph Layout Toolkit functions as a software component. Since it does not include any graphics code, it may be used with any GUI toolkit or windowing system. The Graph Layout Toolkit of the assignee adheres to modem object-oriented programming standards and C++ standards-based development, and is therefore portable to any environment with a C++ compiler supporting the ANSI C++ specification. An ANSI C API is also provided for C application programs: it parallels the capabilities of the interface provided as part of the C++ API. The Graph Layout Toolkit is not dependent on any particular hardware platform. Since most compilers for other languages provide mechanisms to make calls to the C language, the ANSI C API allows programmers to install the Graph Layout Toolkit with most application programs. Of course, the methods of the present invention may be practiced in software, in any programming language, or in hardware. The software embodiment described herein is simply one convenient implementation.

Referring to FIG. 2, a computer system which may be used to implement the present design techniques is shown, having a monitor 210, a keyboard 220 and a mouse 230. A mouse cursor 240 appears on the screen and moves as the mouse is moved. The internal hardware of the computer workstation of FIG. 2 may be represented in simplified block diagram form as shown in FIG. 3. The computer system has a central processor 302, a system memory 304, a display 306, a printer 308, a keyboard 310, a pointing device 321, a disk storage subsystem 314, and I/O controller 316, and interconnecting means such as a system bus. The computer workstation may be part of a larger network of computers interconnected by a local area network (LAN), for example. The computer configuration described should be understood as being merely exemplary of a wide variety of computer configurations and architectures in which the present invention may be employed.

Labeling Quality

The GFLP problem tries to assign placements to (text) labels for a predefined set of graphical features of a drawing, such that each label communicates information about its corresponding graphical feature in the best possible way. There are three basic rules that, in general, give an accurate assessment of the quality of a label assignment:

1. No overlap of a label with other labels or other graphical features of the layout is allowed.
2. Each label can be easily identified with exactly one graphical feature of the layout (i.e., the assignment is unambiguous).
3. There is a ranking of all the label placements for every graphical feature.

The first two rules are used to evaluate the clarity of the association of the labels to their corresponding graphical features. The third rule is used to evaluate the overall quality of a given label assignment with respect to the ranking of the label placements. The ranking of the potential label placements for a graphical feature typically captures an aesthetic preference with regard to label positioning, an essential criterion for the labeling quality of geographic (and to some extent technical) maps. It also allows the introduction of problem-specific constraints that are specific to technical maps and layouts. E.g., for the labeling of the edges of a graph layout, a problem-specific constraint might be that the label of an edge must be closer to the source (or destination) node.

Since the drawing is fixed, there are instances where even an optimal labeling solution might produce label assignments that do not strictly follow the above rules. In this case, there should be a way of evaluating how good a labeling solution is. This evaluation is made possible by assigning to each label placement a quantity that evaluates the quality of that label placement. This quantity is called COST. COST (i,j) is a function that gives the penalty of having assigned label placement j to graphical feature i in the final labeling solution. The COST for each label placement j is a linear combination of:

1. The penalty with respect to the ranking of j; and
2. The penalty which reflects the severity for j of the violation of the first two basic rules.

Label Placement

In order to completely describe the labeling problem, one must define how to construct the set of potential label placements for any graphical feature. The labeling of the edges of a drawing of a graph will be used as an example to illustrate some of the basic definitions necessary for this method.

First, rules must be specified that interpret the "Basic Rules For Labeling Quality," since for different graphical features, different rules can apply. In the case of the ELP problem, those rules might be:

1. A label placement respects the first rule if it does not overlap any graphical feature. It is allowed to be adjoined to the edge that it belongs to.

2. A label placement respects the second rule if it touches the edge that it belongs to.

In FIG. 1(a), label placements A, B, C, D and E are potential label placements for the edge (1, 2). Label placements A, B and D follow the first two rules, and hence their cost depends only on their ranking. Label placement C intersects the edge that it belongs to, which is a violation of the first rule. If a drawing has multiple edges with labels like E floating between edges, it is impossible to have a clear understanding of which edge that label belongs to. Therefore, the second rule must be followed such that labels like E are avoided in a final labeling solution.

The set of all potential label placements for a given edge can be defined in the discrete or continuous labeling space. In the discrete labeling space, the set of all potential label placements is finite, and each label placement is identified by its position in the layout, as exemplified in FIG. 1(a). In the continuous labeling space, the set of all potential label placements is infinite. For each edge there is defined a region which is bounded by a closed line, such that each potential label placement for that edge is contained within that region. Candidate label placements are label placements that have at least one intersection point with their associated edge. By imposing this restriction, labels like E in FIG. 1(a) are avoided.

The shaded region around edge (1, 2) in FIG. 1(b) is the continuous labeling space for that edge, and any label placement inside that shaded region is a candidate label placement for that edge.

One major difference between the PLP (Point Label Placement) and ELP (Edge Label Placement) problems is in the definition of a legitimate potential label placement. First, a potential label placement is a label placement that can be part of a final labeling solution. In the PLP problem, the only potential label placements are label placements that do not overlap any graphical feature of the layout except other label placements. But in the ELP problem, potential label placements include not only label placements that follow the same rules as in the PLP problem, but also label placements that overlap their associated edges.

In FIG. 1(a), label placements like A, B and D are preferable; but certainly label placements like C, which overlaps its associated edge, are acceptable, provided that the appropriate cost is charged.

Formulation Of The GFLP Problem

The GFLP problem is an optimization problem, since the objective is a labeling solution of minimum cost. Each label placement in a final solution carries a penalty calculated by the COST function. The objective is to find a set of label placements, one for each graphical feature, that yields minimum total cost.

THE OPTIMAL ELP PROBLEM: Let G be a drawing, and let E be the set of all graphical features to be assigned label placements. Also, let W be the set of all potential label placements for any given graphical feature in E, and let k be the number of labels per graphical feature.

PROBLEM: Find a labeling solution that minimizes the following function:

$$\sum_{i=1,|E|} \sum_{j=1,|W|} COST(i, j) P(i, j)$$

where

-continued $$P(i, j) = \begin{cases} 1, \text{ if label placement } j \text{ is assigned to graphical feature } i, \\ 0, \text{ otherwise} \end{cases}$$

and $$\sum_{j=1,|W|} P(i, j) = k, \text{ for } 0 < i < |E| + 1$$

Solving The GFLP Problem

The GFLP problem can be viewed as the problem of finding a matching label placement for each graphical feature, where each label placement is free of overlaps. Label placements may be matched to graphical features by formulating the GFLP problem as a graph matching problem. This graph matching problem will be the first phase of the present algorithm that solves the GFLP problem.

It is advantageous to group label placements together on the basis of their mutual interdependence. Each label that belongs to a group can potentially overlap at least one other label within the group. This idea may be further restricted by introducing the following relation R.

RELATION R: For any potential label placements x, y, if x R v then ∀ z, where z is a potential label assignment, z overlaps x if and only if z overlaps y as well. This relation restricts the number of qualified label placements that can be included in a group. Each group is actually a class for relation R. Furthermore, each label that forms a single class in R does not, by definition, overlap any other label. A set W of potential label placements for respective graphical features of the input drawing is constructed by reducing the size of the set Q of all potential label placements of graphical features in the drawing.

Any label in the set W has the property that it belongs to exactly one class of relation R, and in a final labeling solution (with no overlaps of label placements) only one label placement of each class of relation R can be part of the final solution.

By introducing relation R, the GFLP problem may be formulated as a maximum-cardinality, minimum-weight matching problem of a bipartite graph Gmatching ($V_{GF}$, $V_{labelClass}$, $E_{matching}$) where:

1) Each node in $V_{GF}$ corresponds to a graphical feature of the drawing;
2) Each node in $V_{labelClass}$ corresponds to a class of relation R; and
3) Each edge i in $E_{matching}$ connects a node j in $V_{GF}$ (graphical feature j of the drawing) to those nodes $v_x$ in $V_{labelClass}$ that have as members label placements of j. The weight of each edge i is the ranking of the label placement ($v_x$).

An example of a matching graph is shown in FIG. 4. A line divides the graph into two portions such that each edge in the graph crosses the line. This is the defining feature of a bipartite graph. Nodes in the upper half of the graph represent graphical features with respect to which labels are to be placed. Each node in the lower half of the graph represents a class of conflicting (overlapping) label placements. Only one label placement from each class can be part of the final labeling solution. An edge between a node in the upper half of the graph and a node in the lower half of the graph denotes that the class represented by the node in the lower half of the graph contains one or more acceptable label placements for the graphical feature represented by the node in the upper half of the graph. A node in the lower half of the graph may have multiple incident edges, each from different nodes in the upper half of the graph, denoting that the class represented by the node contains acceptable label placements for each of multiple graphical features. Since only one label placement may be chosen from among the class represented by the node, all but one incident edge of the node must be eliminated in the course of finding a labeling solution.

The optimal labeling solution with respect to the set W of label placements may be obtained if a maximum-cardinality, minimum-weight matching of the matching graph may be found. Cardinality refers to the number of edges of the graph, i.e., the number of graphical features for which a label placement has been found. In the maximum-cardinality, minimum-weight matching, therefore, the maximum possible number of nodes in the upper half of the graph each have a single edge connected to a respective node in the bottom half of the graph, where the total cost of the set of edges, for a given cardinality, is minimized.

One major factor in the feasibility of the foregoing approach is the construction of the set of label placements, W. As previously mentioned, each of these label placements belongs to exactly one class of relation R. At the beginning there can be an infinite number of label placements for each graphical feature.

The first step is to reduce the number of label placements to a smaller set Q such that each graphical feature has a finite number of label placements associated with it. This reduction is achieved by working with the discrete labeling space. Also, each label placement is associated with exactly one graphical feature.

The finite set of label placements may be described by an overlap graph $G\_\{OV\}$ $(V\_\{OV\}, E\_\{OV\})$ where:
1. Each node in $V\_\{OV\}$ corresponds to either a graphical feature of a label placement;
2. Each edge in $E\_\{OV\}$ either connects a node corresponding to a label placement to a node corresponding to an edge that this label is assigned to, or connects two nodes that correspond to label placements that overlap.

The overlap graph serves as a model to described the set Q of label placements. The final goal in the first phase of the algorithm is to reduce the initial set of label placements Q to a smaller set of label placements W such that W is one side of the matching graph. Finding the set W of label placements allows the matching graph to be constructed. Because the matching graph is a bipartite graph, polynomial algorithms exist to find the maximum cardinality minimum weight matching of that graph.

The matching yields the optimal solution for the GFLP problem on the set W of label placements. Clearly, once the matching graph as been obtained (implying that the set W has been defined), the problem thereafter can be solved optimally. But the GFLP problem is NP-hard, indicating that it is the creation of the overlap graph and the its reduction to the matching graph that bounds the solution space of the GFLP problem in such a way that the new, restricted solution space can be explored in polynomial time. The following very important conclusion may therefore be drawn with respect to the GFLP problem and the methods described herein:

1. Once the matching graph is computed, then the GFLP problem can be solved optimally in polynomial time.
2. There cannot be a polynomial-time algorithm for creating the matching graph (from which the optimal solution to the GFLP problem can always be found).

Hence, the main steps for reducing the complexity of the GFLP problem are (a) the construction of the overlap graph, and (b) the reduction of the overlap graph to the matching graph.

The following description presents a framework for reducing the complexity of the GFLP problem along with examples of heuristics that can be used within the framework. Referring more particularly to FIG. 5, given an input layout, first an overlap graph is constructed that accounts for overlap of potential label placements. An example of an overlap graph is shown in FIG. 8(b). Nodes in the upper half of the graph represent graphical features, e.g., edges. Nodes in the lower half of the graph represent individual potential label placements for those edges. Edges are used to associate graphical features with their potential label placements. Overlaps between respective pairs of potential label placements are represented by respective edges between corresponding nodes in the lower half of the graph.

The main algorithm for solving the GFLP problem may have two phases:

In Phase 1, the set $W \subseteq Q$ of potential label placements for the input drawing G is built. Next, there is found a labeling solution with respect to that set W of label placements by solving a variant of the matching problem for bipartite graphs.

In Phase 2, heuristics are used to improve the solution created in Phase1 by looking for solutions within the entire solution space, and by removing some of the restrictions with respect to the quality of the label placements. The Phase 2 algorithm may be based on local improvement techniques, guided depth-first search with backtracking, etc. The goal of Phase 2 is to improve the size of the solution obtained in Phase 1.

The overlap graph can be constructed several ways. For example, Heuristic A, described hereinafter in relation to FIG. 11, or Heuristic B, described hereinafter in relation to FIG. 12, can be used to construct the overlap graph. In a special case to be described, the overlap graph is identical to the desired matching graph. In the general case, the overlap graph is transformed to the matching graph using Heuristic C, described hereinafter in relation to FIG. 13.

The matching graph can be constructed in several ways. For example, Heuristic C, described hereinafter in relation to FIG. 13, can be used to construct the matching graph.

In general, known methods may be used to find the maximum-cardinality, minimum-weight matching of the bipartite matching graph. In the special case referred to above, a fast solution to this problem may be obtained using Heuristic D, described hereinafter in relation to FIG. 14.

The steps described thus far correspond to Phase 1 of the algorithm. If after Phase 1 a placement has been found for all graphical features, then the program concludes. If not, then the program enters Phase 2. In Phase 2, conventional backtracking techniques may be used in an attempt to further improve the solution.

The overall program flow, including both Phase 1 and Phase 2, is depicted in FIG. 15. The program receives as its input a drawing G having a set of graphical features GF. The program begins by executing Phase 1. In Step 1 thereof, an overlap graph Gov is computed for G. The results of Phase 1 depend upon the set of discrete labels used to form the overlap graph. Phase 1 may therefore be repeated in a loop until a complete labeling solution is found, until a partial but sufficient labeling solution is found as defined by a user-set threshold, or until a number of iterations have been performed. In the first iteration, the maximum number of potential label placements is used. In each succeeding iteration, potential label placements are removed from the set. For example, label placements that produce the most overlaps may be removed. Label placements may be removed if they belong to graphical features that, following removal, will still have a number of label placements associated with them in the overlap graph.

In Step 2, the overlap graph is reduced to a matching graph. In Step 3, the matching graph may be further reduced, if specified, in a manner described in greater detail hereinafter.

In Step 4, the matching algorithm is run on the matching graph. If a complete labeling solution has been found, if a partial but sufficient labeling solution has been found as defined by a user-set threshold, or if a specified number of iterations have been performed, then the loop is exited and, if necessary, Phase 2 processing is begun.

In Step 1 of Phase 2, a backtracking algorithm is run. Running the backtracking algorithm may allow a complete labeling solution to be found. In Step 2, if there are still graphical features with no label placement assigned, then the restrictions on the overlapping of labels with graphical features may be relaxed. For example, some percentage of overlap, say 5% or 10%, may now be deemed acceptable. The backtracking algorithm is then run again. Finally, in Step 3, if there are still graphical features with no label placement assigned, then different styles of labels may be used in order to facilitate placement, as shown in FIG. 10(*a*), FIG. 10(*b*) and FIG. 10(*c*). Another possibility is to simply choose label placements for the remaining features with less consideration of label quality.

An overview of the present labeling algorithm having been presented, various steps within Phase 1 and Phase 2 of the algorithm will now be examined in greater detail, in particular the heuristics used to form the overlap graph, reduce it to a matching graph, and finally find a maximum-cardinality matching for the matching graph.

In Phase 1, the basic idea is to restrict the set of potential label placements for drawing G to a set W such that each label placement in that set belongs to a class of relation R. This problem may be decomposed into two subproblems: First create the discrete labeling space; Second, reduce that space to set W.

To create the discrete labeling space, for each graphical feature i in G, its continuous labeling space is defined, denoted as LS(i). Any label of i must be entirely inside LS(i). The continuous labeling space for each graphical feature is reduced by not allowing label placements to overlap any graphical feature of the layout (except another labeling space). This can be done easily by removing any part of a labeling space that overlaps a node or an edge.

This reduction splits the continuous labeling space for each graphical feature of G into a set of mutually disjoint regions. Those regions for graphical feature i are denoted as SubLS(i,j) where 0<j<k+1, and k is the number of the disjoint regions of i. The union of all of the mutually disjoint regions of a graphical feature i is the reduced labeling space for graphical feature i, denoted RLS(i)=∪j SubLS(i,j).

Reducing the labeling space for each graphical feature constitutes the first step towards finding a discrete labeling space for the input layout. This reduction of the labeling space has the following interesting property: It clusters together regions of different graphical features such that a label placement of a given graphical feature which belongs to a given region can overlap only label placements of some other region of the same cluster. This reduction allows only high quality label placements to be considered in the Phase 1 of the algorithm, because each label placement in the final assignment of Phase 1 will be free of overlaps. Also, by dividing the drawing G into clusters, the search space for potential conflicts (overlaps) is significantly reduced.

The example of labeling the edges of a drawing of a graph (the ELP problem) will be used to illustrate the reduction concept.

Given an input graph G, if the layout of G is planar (i.e., has no edge crossings), then the faces of that planar graph are the "clusters" of G. If the layout has crossings, then a planar graph Gclusters is constructed by introducing for each crossing a virtual node. The resulting graph is planar, and the faces of Gclusters are the clusters of G. FIG. 6(*a*) shows the layout of an original graph G. FIG. 6(*b*) shows a graph Gclusters which has been obtained from G by introducing virtual nodes, which are denoted by squares. Finally, in FIG. 6(*c*), the shaded regions are the clusters of G.

Heuristics To Form The Overlap Graph

An overlap graph, denoted $G_{ov}(V_{ov},E_{ov})$, has a structure that describes a discrete labeling space for a drawing and any overlaps of label placements that can occur. Introducing the overlap graph concept allows the reduced continuous labeling space to be mapped to a discrete labeling space, a step which is necessary to construct the bipartite matching graph, denoted as $G_{matching}$.

There are several ways to construct an overlap graph. Two simple heuristics will be described.

HEURISTIC A

Heuristic A first determines if the reduced labeling space of each graphical feature in the drawing overlaps the labeling space of other graphical features. Then it divides the labeling space of each graphical feature into three sets:

1) The set NOV of all disjoint regions of the labeling space that do not overlap the labeling space of any other graphical feature.
2) The set 2OV of all disjoint regions of the labeling space that overlap the labeling space of exactly one other graphical feature.
3) The set MOV of all disjoint regions of the labeling space that overlap the labeling space of at least two other graphical features.

This partitioning of the solution space identifies the areas of the drawing where conflicts of label assignment can occur, and from that partition the structure of the overlap graph is revealed. This partition of the solution space identifies the areas of the drawing where conflicts of label assignment can occur, and from that partition the structure of the overlap graph is revealed. For example, if for some graphical feature a member of the set of NOV regions can include a label for that graphical feature, then there exists at least one label placement that can be assigned to that graphical feature that is not in conflict with any other label placement of the drawing.

There are two cases, however, where it is not immediately clear how the overlap graph is to be constructed: a region may not be large enough to include a label, or a region might be large enough to include more than one label placement. In the latter instance, if the region is a NOV region, then the label placement is chosen that has the highest ranking among all possible label placements for that region, or, if more than one label is allowed per graphical feature, then some number of the highest ranking label placements is chosen, up to the maximum number of label placements for that region. If the region is a 2OV or MOV region, then a number of label placements is assigned to each graphical feature that is on the border of that region.

In the former case where the region is not large enough to accommodate a label placement, that region is incorporated into to some other adjoining region of the same edge. Obviously, if a NOV region is combined with a 2OV or MOV region, then the new region is 2OV or MOV. Similarly, if a 2OV region is combined with an MOV region, then the new region is MOV.

FIG. 11 gives a more detailed description of the algorithm of HEURISTIC A. The algorithm may best be appreciated from an example of the application of the algorithm to labeling of the edges of a layout of a graph (the ELP problem), such as the simple graph of FIG. 7(a) having nodes 1, 2 and 3 and edges (1,2), (2,3) and (1,3).

Referring first to FIG. 11, in Step 1, the partitioning described above is performed. For each cluster, each edge that is a part of the border of the cluster is considered in turn. The labeling space of that edge is divided into the three types of regions, NOV, 2OV and MOV. FIG. 7(a) shows how a cluster of a drawing is partitioned into the three types of regions. The labels of each edge for which label placements are to be found are shown in the left-hand portion of FIG. 7(a). Within the cluster, the continuous labeling space for edge (1,2) may be imagined as being obtained by, in effect, sliding the label for edge (1,2) along the edge in its various possible orientations. The continuous labeling space for edge (1,2) is shown by a solid line, the continuous labeling space for edge (2,3) is shown by a heavy dashed line, and the continuous labeling space for edge (1,3) is shown by a light dashed line. NOV, 2OV and MOV regions are identified based on overlap of these continuous labeling spaces.

These regions are shown by light dashed lines that, for clarity of illustration, have been extended outside the cluster. In the example of FIG. 7(a), the size of the labels is such that the innermost regions of the cluster does not belong to any of the continuous labeling spaces. Hence, in FIG. 7(a), there are three NOV regions and three 2OV regions but no MOV regions. These regions can be refined further according to constraints on the orientation of the labels. FIG. 7(b) shows the refined partitioning of the labeling space when the labeling solutions are constrained to be parallel to the horizontal direction. This refined partitioning will be assumed for purposes of the remainder of the description of HEURISTIC A.

Referring again to FIG. 11, in Step 2, building of the overlap graph starts by, for each edge in the original graph, introducing a node representing that edge into the overlap graph. Then, as presently described, the discrete labeling space for each graphical feature is determined, with a node being introduced for each label position, joined by an edge to its corresponding graphical feature.

For purposes of the present description, recall that SubLS (i,k) is a set of k mutually disjoint regions (sub-labeling spaces) of a graphical feature i, and RLS(i) (the reduced labeling space) is the union of such regions. For each cluster in the original graph layout, each edge is considered in turn. First the NOV portions within the cluster for the edge i are considered. If an NOV portion can accommodate at least one label placement, then a node for each such label placement is introduced into the overlap graph, joined by an edge to the node representing the edge i. The assignment of the set of potential label placements for each edge of the cluster after applying HEURISTIC A is shown in FIG. 8(a), whereas FIG. 8(b) shows the portion of the overlap graph resulting from that cluster. Hence, referring to FIG. 8(a), it is determined that, for edge (1,2), a label placement identified by the number 3 may be accommodated within the NOV region for edge (1,2). A node 3 is placed in the overlap graph, shown in FIG. 8(b), joined by an edge to the node (1,2), representing the edge in the original graph.

If the region cannot accommodate a label placement, then the algorithm attempts to join the region to, in order of preference, an adjoining 2OV region or an adjoining MOV region. If the region cannot be joined to an adjoining region, then the region cannot be used in the labeling solution and is deleted from the reduced labeling space.

A similar sequence of steps is then performed for 2OV regions of the edge i. Notice that in FIG. 8(a), a determination has been made that the 2OV region for edges (1,2) and (1,3) can accommodate two label placements, numbered 1 and 2, for the edge (1,2). Nodes 1 and 2 are therefore introduced into the overlap graph, joined by edges to the node (1,2). If a 2OV region cannot accommodate a label placement, then the algorithm attempts to join the region to an adjoining MOV region, else the region is deleted from the reduced labeling space.

A similar sequence of steps is then performed for MOV regions. If an MOV region cannot accommodate a label placement, then the region is simply deleted.

Finally, in Step 3 of FIG. 11, all of the conflicts between the label placements determined in Step 2 are found. If two label placements overlap, then they are joined by an edge in the overlap graph. In the example of FIG. 8(a), therefore, overlap between label placements 1 and 10 and between label placements 4 and 6 is indicated by adding respective edges between these label placements within the overlap graph of FIG. 8(b).

HEURISTIC B

Heuristic B assigns to each graphical feature in G a number of discrete label positions in the reduced labeling space, and thus produces a discrete labeling space to be described by the overlap graph. Then the original graph drawing is scanned to find potential conflicts (overlaps), and this information is stored in the overlap graph. In the reduced labeling space in accordance with HEURISTIC B, only overlaps of label placements of different graphical features are possible.

FIG. 12 gives a more detailed description of this algorithm. The first portion of Step 1 of HEURISTIC B is the same as described previously for HEURISTIC A. Step 2 of HEURISTIC B is also the same as described previously for HEURISTIC A. HEURISTIC B differs from HEURISTIC A in the manner in which label placements are determined.

In particular, in HEURISTIC B, for each edge in the original graph and for each sub-labeling space of that edge, a number of discrete labels are assigned to the edge. For each label so assigned, a node is introduced into the overlap graph.

Using again as an example the labeling of the edges of a layout of a graph (the ELP problem) to illustrate HEURISTIC B, FIG. 9(a) shows how in Step1 of HEURISTIC B discrete labels may be assigned by dividing a cluster by horizontal lines. Briefly, a cluster is divided by introducing equally spaced strips. The strips are arranged such that the height of some number, one or greater, of consecutive strips is equal to the unit height of the labeling solution. These strips divide the layout into equal height horizontal segments, and any potential label placement must lie entirely within a set of consecutive horizontal segments.

Three sets of strips are shown. The first set of strips is for edge (1,2). These strips extend the length of edge (1,2) and are indicated in solid lines. The second set of strips is for edge (2,3) and is indicated in heavy dashed lines, and the third set of strips is for edge (1,3) and is indicated in light dashed lines. These two sets of strips extend only along the length of their respective edges, which in this example project onto different segments of the edge (1,2).

FIG. 9(b) shows the numbered label placements for each edge subject to the constraint that each label is contained within a number of unit-height horizontal segments (in this example, one segment). FIG. 9(c) shows the portion of the overlap graph resulting from that cluster.

Note that in both HEURISTIC A and HEURISTIC B, in identifying a discrete labeling space, either all discrete label placements that follow a given rule may be chosen, or a subset of those label placements may be chosen. Therefore, in the first phase of the method, a loop can be inserted (as described previously in relation to FIG. 5) that can help find a better set of discrete label placements by observing the size of the labeling solution assigned in the matching section of the first phase of the method.

Heuristics To Form The Matching Graph

In order to speed up the search for a labeling solution, the matching graph $G_m(V_{mE}, V_{mL}, E_m)$ may be obtained by reducing the overlap graph $G_{ov}(V_{ov}, E_{ov})$ to it. As has been noted, the matching graph is a bipartite graph such that each node in $V_{mE}$ is a graphical feature of drawing G, and each node in $V_{mL}$ is a class of relation R. Generally speaking, the overlap graph is reduced to a matching graph by deleting a number of label placements such that the rest of the label placements belong to exactly one class in R.

The set of nodes $V_{ov}$ of $G_{ov}$ can be partitioned into two subsets, $V_{ovE}$ and $V_{ovL}$ where each node in $V_{ovE}$ is an edge in the original graph, and each node in $V_{ovL}$ is a label. The goal is then to further partition the set of nodes in $V_{ovL}$ into subsets such that each subset will be a node in $V_{mL}$. Each node in $V_{mL}$ is a class of relation R. Let $G_R(V_{label}, E_{conflict})$ be a subgraph of the overlap graph obtained by removing all nodes in $V_{ovE}$ and their incident edges. The graph $G_R$ represents the overlaps conflicts of the set of label placements W.

There can be as many classes in R as the number of connected components in $G_R$. A connected component in $G_R$ contains the members of a class if and only if it is a complete graph. If any of the connected components is not a complete graph, then the objective is to break it into new connected components by removing one or more nodes and their incident edges. This is repeated until all the connected components are complete graphs. Then, each connected component is represented by a node in $V_{mL}$ and is joined by edges in $E_m$ to the nodes in $V_{mE}$ to which label placements that are part of that connected component belong.

The best reduction is the one that eliminates those nodes of $G_R$ that do not affect the cardinality of the maximum matching of the bipartite graph $G_m$, since the maximum-cardinality minimum-weight matching of $G_m$ will give an optimal labeling solution with respect to the set of label placements W. Since this part of the GFLP problem is very likely NP-hard, a heuristic is used to reduce the overlap graph to the matching graph.

FIG. 13 describes in detail an algorithm, HEURISTIC C, that reduces the overlap graph to a matching graph. In FIG. 13 and elsewhere in the present specification, a node v that represents an edge is denoted as $v_E$; a node $v_E$ representing edge i is denoted as $v_{Ei}$. A node that represents a label is denoted as $v_L$; a node $V_L$ representing a label of edge i is denoted as $v_{Li}$.

Referring to FIG. 13, in Step 1, the graph $G_R$ is built by first setting $G_R$ to the overlap graph and then removing the nodes in the upper half of the graph, together with their incident edges. In Step 2, building of the matching graph $G_m$ is begun by adding a node in the upper half of the matching graph for each graphical feature (e.g., edge) in the original graph.

It may be that there is only one possible label placement for a particular graphical feature, or edge. Choosing from a single possibility is easy. Therefore, in Step 3, if there is only one label placement node in the graph $G_R$ that corresponds to edge i, then any nodes incident to this node (i.e., nodes for all label placements that conflict with this label placement) are removed. In the following Step 4, if a label placement node has degree zero, indicating there were no conflicting label placement nodes or that such nodes have been removed, then a corresponding label placement node is added to the matching graph along with a connecting edge to the node representing the appropriate graphical feature. The label placement node having degree zero is removed from the graph $G_R$.

Then in Step 4, the connected components in the graph $G_R$ are checked to see if they are complete graphs. A connected component that is a complete graph represents a set of label placements from which, because every pair of label placements chosen form the set conflicts, one label placement may be chosen as part of the final labeling assignment. For each connected component that is a complete graph, therefore, a node is added to the matching graph and edges are added from that node to each graphical feature to which a label placement within the set corresponds. The connected component is then removed from the graph $G_R$.

In Step 5, only connected components that are not complete graphs remain. The objective is to selectively remove ("throw away") label placement nodes in order to form connected components that are complete graphs. Of course, the label placement nodes that are thrown away should be those that are least needed or least useful. If in the matching graph a node representing a graphical feature (e.g, edge) is already connected to at least two nodes of degree two (each representing sets of conflicting label placements), and if a node representing another graphical features is also connected to the same two nodes, then label assignments for both of the graphical features can be made: a label placement from one of the nodes of degree two can be assigned to one of the graphical features, and a label placement from the other node of degree two can be assigned to the other graphical feature. Hence, in a connected component that is not a complete graph, a label placement node that corresponds to either of the two graphical features in the case described above can be eliminated as unnecessary. It is removed from the graph, and program flow returns to Step 3.

At some point, every instance of this special case will have been detected and the unnecessary label placement nodes eliminated. At this point, nodes representing label placements that are least useful are eliminated. In particular, if a label placement node is of high degree, then the label placement overlaps with a large number of other label placements. If in the connected component under consideration there is a node having a higher degree than all remaining nodes in the connected component, then that node is removed. Otherwise, a node is randomly removed from among a group of nodes in the connected component that are tied for having the same highest degree. For example, if a connected component had nodes of degree 3, 2 and 1, then the node of degree 3 would be removed. If the connected component had nodes of degree 3, 3 and 1, then a random one of the nodes having degree 3 would be removed. Program flow then returns to Step 3.

Finding The Maximum Cardinality Minimum Weight Matching

One can prove that a maximum-cardinality minimum-weight matching of the matching graph $G_m(V_{mE}, V_{mL}, E_m)$ will give an optimal labeling solution with respect to the label placements in set W that are members of relation R. The size of the matching graph depends on the size of set W and the density of conflicts (overlaps). The size of the matching graph is a critical element in finding the matching, since it takes quadratic time to find the maximum-cardinality minimum weight matching of a graph.

The following measures may be taken in order to further reduce the time complexity of the matching:

1) As a preprocessing step, apply Steps 1 and 2 of the algorithm in FIG. 14, described below. In most cases, this reduces the size of the matching graph, after which a known matching algorithm may be applied.

2) Find only the maximum-cardinality matching of the matching graph, which will give a labeling solution of the same size as the optimum solution, but in most cases with less quality.

3) Reduce the matching graph further such that each node in $V_{mL}$ corresponds to at most two graphical features of the original graph. The graph $G_m$ then has that property then each node in $V_{mL}$ will have at most degree two. For such bipartite graphs, the algorithm of FIG. 14 runs in linear time and produces a maximum-cardinality matching. Furthermore, the algorithm guarantees that each node in $V_{mE}$ will in the worst case be matched with the second-best (with respect to weight) incident edge.

Let $G'(V_E,V_L,E)$ be a bipartite graph such that each node in $V_L$ has degree at most two and each edge in E has a weight assigned to it. Then, the algorithm in FIG. 14, HEURISTIC D, finds the maximum cardinality matching for G'. Steps 1 and 2 deal with nodes in the matching graph of degree one. If a node $v_{Li}$ has degree one, then the node represents a single label placement with no overlaps. It may be assigned to a graphical feature without any conflict, if it is the best label placement for that graphical feature. Hence, in Step 1, if the edge connecting the label placement node to the graphical feature node is the minimum-weight incident edge of the graphical feature node, then a match is assigned and recorded. The matching graph is then updated by removing the two nodes and their incident edges.

In Step 2, if a node representing a graphical feature has degree one, then that graphical feature only has one chance to receive a label assignment. The corresponding label placement is therefore assigned as a match and recorded, and the matching graph is updated. This step is repeated until no further matches are made.

After Steps 1 and 2, the nodes representing graphical features that remain in the matching graph are of degree other than one, i.e, degree zero or degree two or more. Nodes of degree zero are deleted, since no match is possible. Then, for the remaining nodes of degree two or more, the two edges of least weight incident to each of these nodes are kept and the remaining edges are deleted. Each node representing a graphical feature now has degree two, and each node representing label placements has degree at most two. The remaining bipartite graph has an interesting structure. It is a simple cycle or a simple path. Any such graph has exactly two maximum-cardinality matchings. Since the number of edges is even, these matchings may be found by simply traversing the cycle or path and choosing as part of the matching only the even-numbered edges or only the odd-numbered edges. Of the two matchings, the matching that has the minimum weight is then chosen.

Different input graph layouts may have different graph layout styles, such as orthogonal, hierarchical and symmetric. Examples of graph layouts in orthogonal, hierarchical and symmetric style as shown in FIG. 16, FIG. 17 and FIG. 18, respectively. In these layout styles, where edges on the average are long and neighboring edges travel alongside to their destination nodes, their matching graphs naturally resemble the structure of the input graphs for HEURISTIC D. That makes HEURISTIC D attractive not only because of its reduced time complexity but also because of the solutions that it produces.

A matching graph that satisfies the conditions of HEURISTIC D may be obtained by splitting the layout space into equally-sized horizontal segments and allowing each label placement to overlap at most one other label placement in the same horizontal segment.

Phase 2

Phase1 produces a labeling solution that does not guarantee assignment of a label placement to each edge of the original graph. When there are edges of the original graph without label placements assigned to them after Phase 1, techniques based on local search and exhaustive search may be employed to find label assignments for those edges. Phase 2 explores the solution space in two ways:

1) It searches the solution space to find if there is enough space, with or without repositioning the previously assigned label placements, to assign label placements to edges without label assignments such that the new label placements do not overlap any graphical feature or other label placement of the drawing.

2) It searches the solution space by relaxing the restrictions on the quality of the label placements by allowing label placements to overlap their associated edges. Repositioning is permitted only if the size of the labeling solution is increased by such action.

The approach employed in Phase 2 is basically to do an exhaustive search. Any such approach is exponential in nature. Because of this exponential nature, a constant number of steps only is allowed for each backtracking. The approach may therefore be further characterized as exhaustive search with pruning. Unnecessary backtracking steps may be bounded by using the information obtained in Phase 1, which reveals the conflict areas of the drawing.

In some cases, either because the algorithm is not successful in finding a complete labeling solution, or because the drawing is very dense such that a complete labeling solution is not feasible, the two phases of the algorithm produce a labeling solution that leaves some edges with no label placement assigned to them. At this point, a trivial approach would be to scale up the size of the drawing to create more space for label placements, or to scale down the size of the labels. Either approach might be acceptable. If scaling is not possible, one attractive solution (especially for interactive programs) is to assign interactive icons to unlabeled edges that can pop-up a small window with the full-size label for that edge when that icon is clicked on. This solution does not really solve the problem, since there are many cases where an interactive approach is not feasible (i.e., the printout of a drawing). The best choice in such an instance may be to place the label of an edge somewhere in the drawing (preferably close to its associated edge) and have some connection (e.g., an arrow) that connects that label to its associated edge. FIG. 10(*a*) and FIG. 10(*b*), respectively, show examples of using an icon instead of a label. FIG. 10(*c*) shows how a label can be put in open space and connected to its associated edge. Furthermore, the placement of "problem" labels can be forced, regardless of the overlaps that are produced. It is then left up to the user to decide what to do and to manually place the problem labels if necessary.

An example of a labeled graph drawing produced using the foregoing method is shown in FIG. 19.

Conclusions

Algorithms that solve the GFLP problem have been presented. Experiments have shown that this approach to solving the GFLP problem is very successful. Since the GFLP problem is NP-hard, neither this algorithm nor any other polynomial algorithm can be expected to produce optimal solutions. Even though the ELP problem has been used to illustrate the different algorithms of this method, the method can be easily generalized in a straightforward manner to the label placement problem for a collection of graphical features of a drawing.

For clarity of description, the invention has been described in terms of placing only one label per graphical feature. It should be understood, however, that the same underlying method may be applied to positioning any number of labels, of any size, per graphical feature. The solution framework presented herein is very flexible and accommodates the needs of the user by allowing the user to define a variation of the GFLP problem and to solve the problem using essentially the same method as presented in FIG. 5.

For example, one may want to find a labeling solution such that each graphical feature has more than one label associated with it. This may be accomplished by, instead of find the maximum cardinality minimum weight matching of the matching graph, finding a maximum cardinality minimum weight "b-matching." As is known in the prior art, a b-matching of a bipartite graph is a matching where, instead of allowing only one matched edge to be incident to each node in the upper half of the bipartite graph, a predefined number of edges (say, at most b) are allowed to be incident to each node in the upper half. This problem can be solved using known polynomial-time algorithms that solve the maximum flow minimum cost problem, or the b-factor problem.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method of assigning label positions to features within a graph drawing, comprising the steps of:
   identifying a subset of potential label placements from among a set of potential label placements;
   representing the graphical features and the potential label placements as nodes within a matching graph separate and distinct from the graph drawing; and
   finding a high-cardinality matching of the matching graph.

2. The method of claim 1, wherein the matching graph is a bipartite graph, nodes within an upper half of the graph representing graphical features and nodes within a lower half of the graph representing potential label placements.

3. The method of claim 2, wherein finding a high-cardinality matching of the matching graph comprises finding a maximum-cardinality matching of the matching graph.

4. The method of claim 3, wherein each label placement has a weight associated therewith.

5. The method of claim 4, wherein finding a high-cardinality matching of the matching graph comprises finding a maximum-cardinality minimum-weight matching of the matching graph.

6. The method of claim 5, wherein each node within the lower half of the graph represents a set of label placements each pair of label placements of which overlap.

7. The method of claim 6, wherein each node within the lower half of the matching graph is of at most degree two.

8. The method of claim 7, wherein identifying a subset of potential label placements comprises: dividing the graphical layout into a number of horizontal segments.

9. The method of claim 8, wherein each potential label placement occupies only one horizontal segment.

10. The method of claim 9, wherein each potential label placement overlaps at most one other potential label placement.

11. The method of claim 6, comprising the further step of, given a matching graph in which at least one node in the lower half of the matching graph is of degree greater than two, reducing the matching graph to obtain a matching graph wherein each node within the lower half of the matching graph is of at most degree two.

12. The method of claim 6, comprising the further steps of:
   representing overlaps of the potential label placements using an overlap graph; and
   building the matching graph using information derived from the overlap graph.

13. The method of claim 12, wherein nodes in the overlap graph represent label placements and edges between such nodes represent overlap between pairs of label placements.

14. The method of claim 13, wherein building the matching graph comprises:
   identifying within the overlap graph connected components that are complete graphs; and
   for each such complete graph, inserting a node in the matching graph and connecting to the node an edge for each graphical feature to which a label placement represented in the connected component corresponds.

15. The method of claim 14, comprising the further steps of:
   selectively eliminating at least one node from the overlap graph; and
   repeating the steps of claim 14.

16. The method of claim 7, wherein finding a maximum-cardinality minimum-weight matching comprises traversing the lower half of the matching graph, selecting alternate edges.

17. The method of claim 12, comprising the steps of:
   selecting odd-numbered alternate edges and computing a corresponding weight;
   selecting even-number alternate edges and computing a corresponding weight; and
   finally selecting one of the odd-numbered alternate edges and the even-numbered alternate edges according to which selection gives the minimum weight.

18. The method of claim 7, wherein identifying a subset of potential label placements comprises:
   for a plurality of graphical features, identifying in accordance with at least one predetermined criterion areas within which labels for the respective graphical features may be placed; and
   based on the preceding step, identifying a plurality of regions in accordance with the number of graphical features for which labels may be placed within each region.

19. The method of claim 18, comprising the further steps of, for each region, in preferential order from regions having only one graphical feature for which labels may be placed within the region to regions having more than two graphical features for which labels may be placed within the region:

determining a number of label placements for one of the graphical features that will fit within the region;

if the number is zero, merging the region with an adjacent region; and if the number is non-zero, placing an equal number of nodes in the overlap graph.

* * * * *